(12) United States Patent
Kärger et al.

(10) Patent No.: US 6,896,647 B1
(45) Date of Patent: May 24, 2005

(54) ELASTIC ROLLER AND PROCESS FOR PRODUCING SAME

(75) Inventors: Jens Christian Kärger, Winterthur (CH); Albert Maria Vodermayer, Dietlikon (CH)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 16 days.

(21) Appl. No.: 09/585,568

(22) Filed: Jun. 2, 2000

(30) Foreign Application Priority Data

Jun. 2, 1999 (DE) .................................. 199 25 421

(51) Int. Cl.$^7$ ............................................. F16C 13/00
(52) U.S. Cl. .......................... 492/50; 492/56; 492/48; 29/895.21
(58) Field of Search ................... 492/50, 30, 53, 492/54, 28, 56; 29/895.21, 895.211, 895.32

(56) References Cited

U.S. PATENT DOCUMENTS

| | | | | |
|---|---|---|---|---|
| 3,662,446 A | * | 5/1972 | Walls .......................... | 492/50 |
| 3,852,862 A | * | 12/1974 | Sukenik ....................... | 492/50 |
| 4,321,033 A | * | 3/1982 | Eddy et al. ................... | 432/60 |
| 4,368,568 A | * | 1/1983 | Watanabe ..................... | 492/52 |
| 4,766,996 A | * | 8/1988 | Gibson ........................ | 492/50 |
| 4,990,963 A | * | 2/1991 | Yamamoto et al. ............ | 492/59 |
| 5,091,027 A | * | 2/1992 | Watanabe ..................... | 156/172 |
| 5,102,741 A | * | 4/1992 | Miyabayashi ................. | 428/447 |
| 5,257,966 A | * | 11/1993 | Watanabe et al. ............. | 492/37 |
| 5,387,172 A | | 2/1995 | Habenicht et al. | |
| 5,679,463 A | * | 10/1997 | Visser et al. .................. | 492/59 |
| 5,735,388 A | * | 4/1998 | Brouwer ....................... | 492/56 |
| 5,804,309 A | * | 9/1998 | Itoh et al. ..................... | 492/56 |
| 5,827,160 A | * | 10/1998 | Ohki et al. .................... | 492/56 |
| 5,836,860 A | * | 11/1998 | Watanabe et al. ............. | 492/56 |
| 6,007,657 A | * | 12/1999 | Eddy et al. .................... | 492/46 |
| 6,030,328 A | * | 2/2000 | Watanabe et al. ............. | 492/56 |
| 6,077,207 A | * | 6/2000 | Yokoyama et al. ........... | 492/52 |
| 6,096,395 A | * | 8/2000 | Hayashi et al. .............. | 428/35.9 |
| 6,283,904 B1 | * | 9/2001 | Itoh et al. ..................... | 492/56 |

FOREIGN PATENT DOCUMENTS

| | | |
|---|---|---|
| CA | 2229214 | 6/1996 |
| DE | 3029288 | 3/1981 |
| DE | 3725742 | 3/1988 |
| DE | 3937246 | 5/1990 |
| DE | 4226789 | * 2/1994 |
| DE | 29722778 | 5/1998 |
| DE | 19709672 | 9/1998 |
| DE | 19729189 | 1/1999 |

(Continued)

*Primary Examiner*—David P. Bryant
*Assistant Examiner*—Marc Jimenez
(74) *Attorney, Agent, or Firm*—Greenblum & Bernstein, P.L.C.

(57) ABSTRACT

Elastic roller and process for producing elastic roller. The elastic roller includes a hard roller core and an elastic coating layer at an outer side of the hard roller core. The elastic coating layer includes an elastic matrix material and fillers imbedded in the matrix material, and at least a portion of the fillers include metallic fillers. The process includes combining at least one metallic filler into an elastic matrix material and applying the combined elastic matrix material and at least one metallic filler onto an outer side of the hard roller core to form an elastic coating layer.

39 Claims, 2 Drawing Sheets

FOREIGN PATENT DOCUMENTS

| | | | |
|---|---|---|---|
| DE | 19749228 | * | 6/1999 |
| EP | 0582950 | | 2/1994 |
| EP | 0655561 | | 5/1995 |
| FR | 2407292 | | 5/1979 |
| GB | 2006922 | | 5/1979 |
| WO | 97/07281 | | 2/1997 |

* cited by examiner

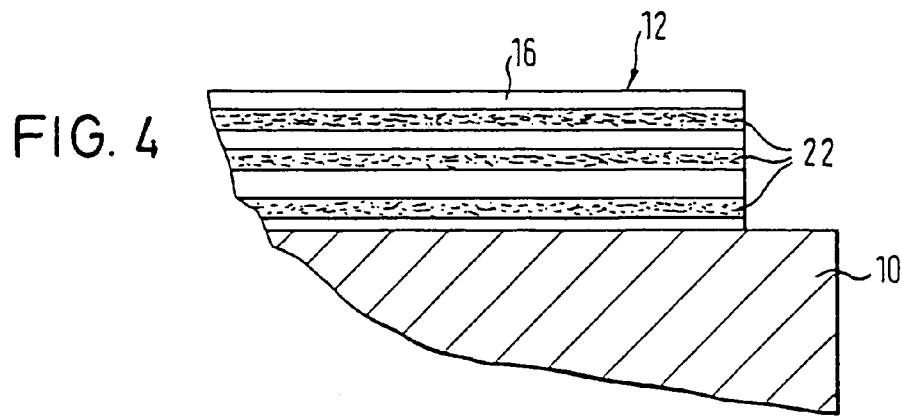
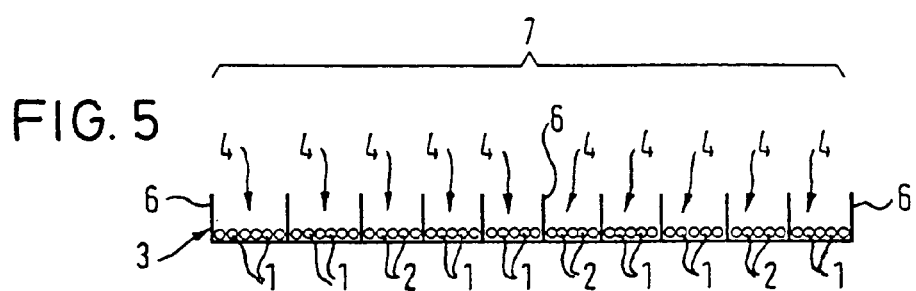
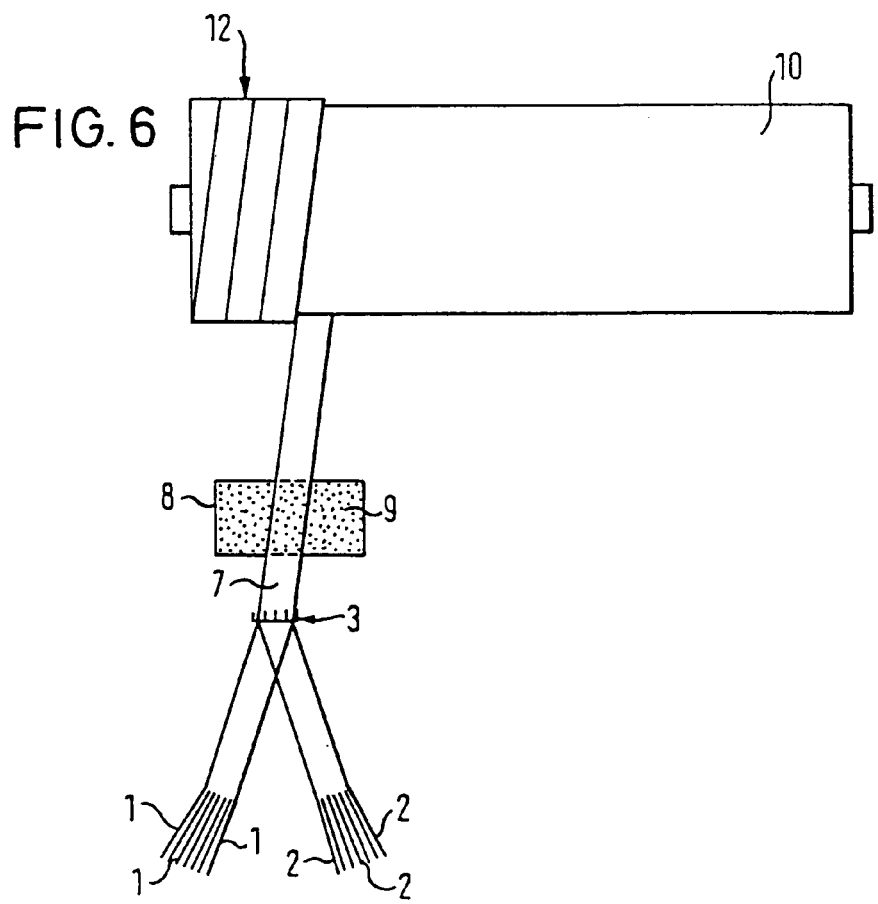

ELASTIC ROLLER AND PROCESS FOR PRODUCING SAME

CROSS-REFERENCE TO RELATED APPLICATIONS

The present application claims priority under 35 U.S.C. § 119 of German Patent Application No. German Patent Application No. 199 25 421.4, filed on Jun. 2, 1999, the disclosure of which is expressly incorporated by reference herein in its entirety.

BACKGROUND OF THE INVENTION

1. Field of the Invention

The present invention relates to a roller, e.g., for smoothing paper webs. The roller includes a hard roller core, which includes metal, and an elastic coating layer located on an outer side of the hard roller core. The elastic coating layer includes an elastic matrix material and fillers embedded in the matrix material. Furthermore, the invention relates to a process for producing such a roller.

2. Discussion of Background Information

Elastic rollers of this kind are, for example, used in glazing of paper webs. In this context, an elastic roller and a hard roller, respectively, together form a pressing nip through which the paper web to be processed is guided. While the hard roller has a very smooth surface that includes, e.g., steel or chilled iron and is provided for smoothing the facing side of the paper web, the elastic roller acting on the opposite side of the paper web increases uniformity and effects compression of the paper web in the pressing nip. The size range of the rollers lies within lengths of about 3 to 12 m and diameters of about 450 to 1500 mm, respectively. They withstand linear forces of up to about 600 N/mm and compressive strain of up to about 130 N/mm$^2$.

Since the trend in paper manufacture is to perform the glazing in online operation, i.e., the paper web leaving the paper machine or the coating machine is directly guided through the paper smoothing device (calender), the requirements for the rollers of the smoothing device are higher than before, e.g., with respect to temperature resistance. Because of the high transport speeds of the paper web which are required for online operation and, thus, the resulting high rotation speeds of the calender rollers, the nip frequency, i.e., the frequency with which the coating is compressed and released again, is increased. As a result, roller temperatures increase. These high temperatures resulting from online operation lead to problems which, in the known elastic rollers, can ultimately lead to the destruction of the plastic coating. In particular, in known plastic coatings, maximum temperature differentials of approximately 20° C. over the width of the rollers are acceptable and the plastic materials conventionally used for the coating have a substantially higher thermal expansion coefficient than the conventionally employed steel rollers or chilled iron rollers. Therefore, a temperature increase causes high axial stress between the steel or chilled iron roller and the plastic coating connected thereto.

Because of these high stresses especially in combination with localized heat points within the plastic coating, so-called "hot spots" can occur at locations where detachment or even rupture of the plastic layer will occur.

These hot spots occur especially when in addition to the mechanical stresses and the relatively high temperature crystallization points in the form of, for example, faulty adhesive connections, deposits, or above average indentations of the elastic coating, e.g., by folds or foreign bodies on the paper web, are present. In these cases the temperature at these crystallization points of conventionally 80° C. to 90° C. can increase to 150° C. resulting in the aforementioned destruction of the plastic layer.

For controlling the properties of the elastic coating layer, fillers and/or fibers are introduced into the matrix material. Depending on the quantity and physical properties of these fillers or fibers, the physical properties of the elastic coating layer are dominated or affected by the fillers or the fibers.

SUMMARY OF THE INVENTION

The present invention provides a process for producing an elastic roller of the type generally discussed above, as well as a corresponding roller, in which the risk of the occurrence of hot spots is reduced.

The roller of the instant invention, while similar in general to the above-discussed rollers, includes at least a portion of fillers which are metallic filler, at least in areas which include metal. A corresponding process according to the invention includes introducing at least one metallic filler into the elastic matrix material.

The metallic fillers introduced into the matrix material result in an improved thermal conductivity of the elastic coating layer and a reduced dissipation in comparison to, e.g., aramide or glass fibers used as fillers. Due to the increased thermal conductivity the superheat occurring at critical locations can be dissipated more quickly so that a surpassing of the critical temperature and, thus, the occurrence of hot spots can be prevented. In this context, because of the high thermal conductivity of a metallic filler an especially quick dissipation of excess heat, for example, in the direction to the roller core is possible.

While the elastic matrix material that conventionally includes resin, has a very poor thermal conductivity so that superheat locations that occur locally are essentially encapsulated, the metallic fillers have an extremely increased thermal conductivity in comparison to the matrix material so that the poor thermal conductivity of the matrix material is practically completely compensated by the metallic filler.

Moreover, since the thermal expansion coefficient of the metallic fillers is smaller than the thermal expansion coefficient of the matrix material, it is achieved that the total thermal expansion coefficient of the coating layer is also smaller than that of the matrix material. In particular, by selecting a suitable metal for the fillers the total thermal expansion coefficient of the coating layer can be adjusted to the thermal expansion coefficient of the roller core. In this way, the longitudinal stresses between the coating layer and the roller core occurring upon heating of the roller can be reduced and, in an optimal situation, can be completely compensated. With this reduction or prevention of the longitudinal stresses, the risk of the occurrence of hot spots, respectively, of the detachment of the cover layer can be further reduced simultaneously.

According to an advantageous embodiment of the invention, at least one portion of the metallic fillers is formed as a metal foam. In this context, the metal foam is impregnated or filled with elastic matrix material.

By employing a metal foam as a metallic filler, an especially uniform distribution of the properties of the elastic coating layer predetermined by the metallic material is provided. By filling the pores present within the metal foam with elastic matrix material, an especially uniform mixing of matrix material and metal foam is achieved so that the elastic coating layer has very homogenous physical properties.

In this context, the metal foam and matrix material can be mixed already before application onto the roller core. However, it is also possible to first apply the metal foam onto the roller core, for example, by spraying, and to introduce the elastic matrix material into the metal foam in a subsequent method step.

According to a further embodiment of the invention, at least a portion of the metallic fillers can be a metal powder, e.g., a nickel powder or chains of nickel powder. In this context, the metal powder can be formed as small sized particles, e.g., having particle sizes between approximately 5 to 50 μm, and preferably between approximately 10 to 20 μm.

In an embodiment as a metal foam, as well as in an embodiment as a metal powder, a very uniform distribution of the metallic fillers over the entire volume of the matrix material and, thus, of the elastic coating layer is possible. In particular, a uniform distribution in the radial direction ensures that the heat occurring at a hot spot within the elastic coating layer can be dissipated in the direction toward the roller core and can be subsequently dissipated by it, e.g., in the axial direction. In this context it is advantageous when the metallic fillers extend radially without substantial disruptions down to the surface of the roller core.

According to a further advantageous embodiment of the invention, at least a portion of the metallic fillers can be formed as metal fibers or metal rovings. The metal fillers can also at least partially be formed as metal-coated fibers and metal-coated rovings. In this case the fibers or rovings can advantageously comprised of carbon and/or glass.

In an embodiment of the metallic fillers as metal fibers or rovings, or as metal-coated fibers or metal-coated rovings the physical properties of the metal may be impressed onto the elastic coating layer. Accordingly, the elastic coating layer in these situations also has a considerably increased thermal conductivity as well as a reduced thermal expansion coefficient in comparison to a pure resin layer.

With a fiber-like embodiment of the fillers, an uninterrupted heat conducting path can be produced along the fiber as a function of its length. Depending on the orientation of the fibers, it is possible to achieve a preferred orientation of thermal conductivity in the radial or in the axial direction or, for a statistically distributed fiber orientation, a uniform distribution of the heat in all directions.

While in the use of metal powder or fibers the elasticity of the matrix material is still of great importance for the total elasticity of the coating layer, in the case employing a metal foam the elasticity of the coating layer is more strongly determined by the metal foam. It is therefore advantageous to employ an elastic metal foam so that the coating layer overall still has the required elasticity.

In addition to the metallic fillers the matrix material may have additional fillers, e.g., in the form of fibers, such as carbon and/or glass fibers. These additional fibers as well as the metallic or metal-coated fibers or rovings can be advantageously arranged in a fiber layer or in radially sequentially positioned fiber layers. Especially when arranging several fiber layers, the properties of the coating layer, for example, its elasticity, can be determined by the number of fiber layers and the spacing between the individual fiber layers. It is also possible to vary the spacing between the fiber layers in the radial direction, especially to increase it in the radially outwardly direction, in order to realize at the surface a higher elasticity and, in the area of the surface of the roller core, a thermal conductivity and a thermal expansion coefficient of the coating layer adjusted to the roller core.

The metal-coated fibers or rovings can be produced in that, before winding them onto the roller core, they are coated with metal, especially by being pulled through a metal bath. In principle, it is also possible to wind the fibers or the rovings substantially dry onto the roller core and to coat them during or after winding with the metal and/or to apply matrix material thereto.

For producing a smooth surface of the roller, the coating layer is advantageously ground after application and drying. This may result in the metallic fillers embedded in the coating layer, when they extend into close proximity to the surface of the coating layer, to become exposed by the grinding process. This is especially advantageous when the surface of the matrix material is additionally coated with a metal for producing an extremely smooth surface because the metallic fillers exposed at the surface of the elastic matrix material provide very good anchoring points for the externally positioned metal coating.

According to a further embodiment of the invention, the coating layer can include a radially outwardly positioned functional layer and a radially inwardly positioned connecting layer for connecting the functional layer to the roller core. The metallic fillers can be arranged at least in the functional layer, at least in the connecting layer, or in both layers. Depending on the embodiment of the metallic fillers, as well as the respective quantity proportions within the layers, the physical properties of the layers are more or less determined by the metallic fillers.

The use of nickel for the metallic fillers is advantageous because nickel forms a very good connection with the resin conventionally used as the matrix material.

The present invention is directed to an elastic roller that includes a hard roller core and an elastic coating layer at an outer side of the hard roller core. The elastic coating layer includes an elastic matrix material and fillers imbedded in the matrix material, and at least a portion of the fillers include metallic fillers.

According to a feature of the invention, the hard roller core can include metal, and the metallic fillers can include metal. Further, the roller is adapted for smoothing paper webs.

At least a portion of the metallic fillers can include a metal foam. The metal foam can be one of impregnated and filled with the elastic matrix material. Further, the metal foam can include pores which are at least partially filled with the elastic matrix material.

Further, at least a portion of the metallic fillers can include a metal powder. The metal powder can include one of nickel powder and chains of nickel powder. Also, the metal powder may include small particles having particle sizes of between approximately 5 to 50 μm, and preferably the particle sizes are between approximately 10 to 20 μm.

In accordance with another feature of the invention, at least a portion of the metallic fillers can include one of metal fibers, one metal rovings, metal coated-fibers, and metal-coated rovings. Further, when the at least a portion of the metallic fillers includes one of metal-coated fibers and metal-coated rovings, fibers of the one of said metal-coated fibers and the metal-coated rovings may include at least one of carbon and glass.

According to still another feature of the invention, at least a portion of the fibers can be aligned in the axial direction, and the at least a portion of the fibers can be a predominant portion of the fibers.

Further, at least a portion of the fibers can be aligned in the radial direction, and the at least a portion of the fibers can be a predominant portion of the fibers.

According to a further feature of the instant invention, at least a portion of the fibers can be aligned in statistical distribution, and the at least a portion of the fibers can be a predominant portion of the fibers.

The fibers can be arranged one of in a fiber layer and in radially sequentially arranged fiber layers.

In accordance with a still further feature of the present invention, at least a portion of the metallic fillers can be elastically formed.

Moreover, the elastic layer can further include additional fillers arranged in the elastic matrix material. The additional fillers can include fibers including at least one of carbon and glass fibers. Also, the additional fillers may include at least one of quartz and PTFE.

The metallic fillers may be arranged to extend up to a radially outer surface of the elastic matrix material, such that the metallic fillers are arranged to penetrate the radially outer surface. Still further, a radially outer surface of the elastic matrix material can be coated with metal.

A thermal conductivity of the metallic fillers may be considerably higher than a thermal conductivity of the matrix material.

According to still another feature of the present invention, a portion of the metallic fillers can be arranged to extend radially inwardly up to a surface of the hard roller core.

A thermal expansion coefficient of the metallic fillers may be smaller than a thermal expansion coefficient of said matrix material. Further, the thermal expansion coefficient of the metallic fillers may be substantially the same as a thermal expansion coefficient of the hard roller core.

The coating layer may include a functional layer arranged in a radially outwardly region and a connecting layer arranged in a radially inwardly region. The connecting layer cam be adapted to connect the functional layer to the hard roller core, and the metallic fillers may be arranged at least in the functional layer.

The matrix material can include a plastic material. Further, the plastic material may include one of a thermosetting resin and a thermoplastic material.

In accordance with another feature of the present invention, the matrix material can include a resin-hardener combination.

A concentration of the metallic fillers may be substantially uniformly distributed within the elastic matrix material. Further, the metallic fillers can include metal powder. Still further, the metallic fillers can include at least one of metal fibers and metal coated fibers.

A concentration of the metallic fillers may increase in a radially inwardly direction toward the hard roller core. Further, the metallic fillers can include metal powder. Still further, the metallic fillers cna include at least one of metal fibers and metal coated fibers.

The present invention is directed to a process for producing an elastic roller that includes a hard roller core. The process includes combining at least one metallic filler into an elastic matrix material and applying the combined elastic matrix material and at least one metallic filler onto an outer side of the hard roller core to form an elastic coating layer.

According to a feature of the present invention, the hard roller core can include metal.

Further, the metallic filler can include a metal foam which is one of impregnated and filled with the elastic matrix material.

The applying may include forming at least one fiber bundle including a plurality of one of metal fibers and metal-coated fibers, and winding the at least one fiber bundle onto the hard roller core. The winding may include winding several superimposed fiber layers on the hard roller core.

According to yet another feature of the instant invention, the fiber bundle may be formed by at least one of at least one fiber roving and a fiber fleece. Further, the fiber bundle may be formed by the at least one fiber roving, and each roving can include a plurality of adjacently positioned fibers of a same kind. Still further, the fiber bundle may be enveloped with the matrix material before being wound onto the hard roller core, e.g., the fiber bundle can be pulled through a matrix bath. Further still, before being wound onto the hard roller core, the fiber bundle or the individual fibers can be coated with metal, e.g., the fiber bundle or the individual fibers can be pulled through a metal bath. The fiber bundle or the fibers may be wound onto the hard roller core in a substantially dry state, and, one of during and after winding, the fiber bundle or the fibers can be coated with at least one of the metal and the matrix material. The fibers are at least one of glass and carbon fibers.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 2, 3, and 4 illustrate rollers with elastic coating layers in accordance with the features of the instant invention;

FIG. 5 illustrate a schematic cross-sectional illustration of a device for separating fibers in rovings; and FIG. 6 illustrates a schematic representation of a roller during it manufacture in accordance with the instant invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
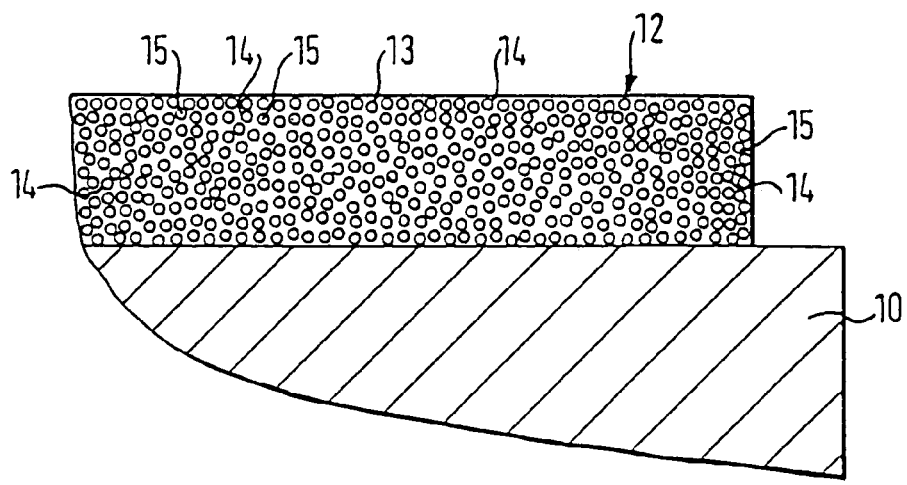
FIG. 1 illustrates a partial longitudinal section of a roller with an elastic coating layer formed in accordance with the features of the present invention.

FIG. 1 illustrates a portion of a roller core 10 in longitudinal section, comprised of, e.g., steel or chilled iron. At an outer side of roller core 10, an elastic coating layer 12 is provided.

Coating layer 12 can include, e.g., an elastic metal foam 13 having a plurality of pores 14. Pores 14 are filled with an elastic matrix material 15 comprising, e.g., a resin-hardener combination. The combination of elastic metal foam 13 with elastic matrix material 15 imparts the required total elasticity to the coating layer 12.

Since metal foam 13 can have a very good thermal conductivity, the heat which is produced during use of the coated roller, e.g., due to flex work, and especially at superheat locations within coating layer 12 at crystallization points can be dissipated very quickly in the direction toward roller core 10 and, subsequently, dissipated in the radial or axial direction of roller core 10. In this context, when employing metal foam 13, it is advantageous that practically over the entire radial and axial expansion of coating layer 12 metallic connecting paths exist between pores 14 so that a quick and unimpaired dissipation of undesirable heat can be ensured.

Moreover, a thermal expansion coefficient of coating layer 12 can be determined primarily by a thermal expansion coefficient of metal foam 13 which, when suitably selected, corresponds approximately to a thermal expansion coefficient of roller core 10. In this way, longitudinal stresses at the connecting location between roller core 10 and coating layer 12, which can be caused by the heat occurring during operation, can be prevented.

Figure 2:
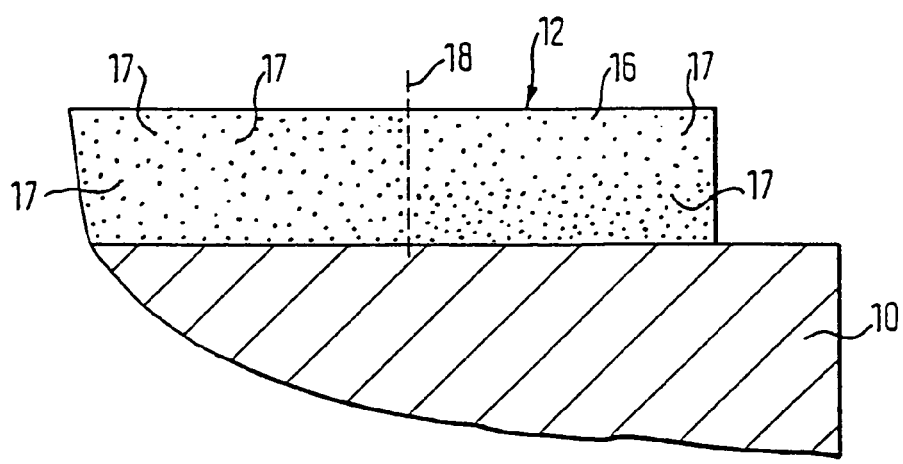

In an alternative exemplary embodiment illustrated in FIG. 2, coating layer 12 can be formed by an elastic matrix material 16 into which metallic fillers 17, e.g., metal powder, such as nickel powder, are introduced. FIG. 2 illustrates two different distribution schemes for metallic fillers 17 in elastic matrix material 16, which are separated by a dashed line 18, which can be utilized separately or combined in a manner similar to that illustrated in FIG. 2. As schematically depicted on the left half dashed line 18 in FIG. 2, metallic fillers 17 can be uniformly distributed across coating layer 12. Alternatively, or additionally, as schematically depicted on the right half of FIG. 2, metallic fillers 17 can be arranged so that the concentration of metallic fillers 17 decreases in a radially outwardly direction.

With such a distribution of metallic fillers 17, coating layer 12 in a radially inwardly region, i.e., in the region near roller core 10, has a total thermal expansion coefficient which is dominated by metallic fillers 17, while in the radially outwardly region, i.e., in the region near the outer surface of coating layer 12, the thermal expansion coefficient of coating layer 12 is determined primarily by the thermal expansion coefficient of elastic matrix material 16. In this manner, the radially outwardly region of coating layer 12 has a higher elasticity, and, at the same time, longitudinal tensions resulting from different thermal expansion coefficients between coating layer 12 and roller core 10 can be reduced in the connection area.

Figure 3:
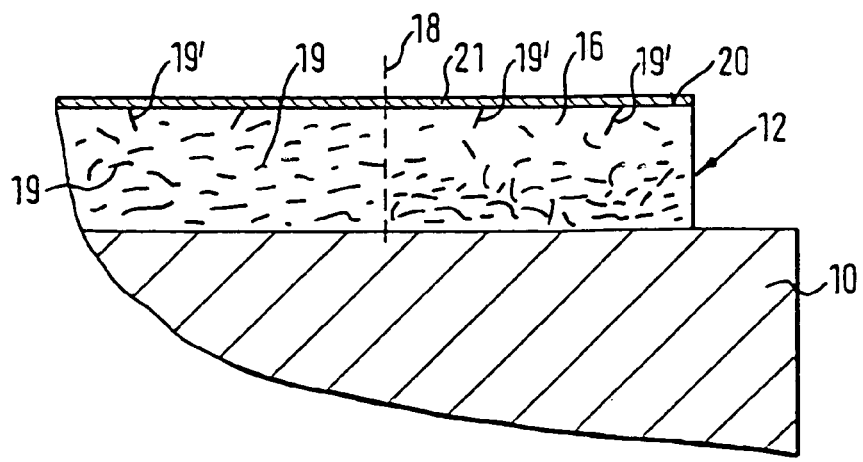

In the embodiment according to FIG. 3, the metallic fillers in elastic matrix material 16 include fibers 19 that are comprised of metal and/or are coated with metal.

As with FIG. 2, FIG. 3 schematically illustrates two different distribution schemes for fibers 19 in elastic matrix material 16, which are separated by a dashed line 18, which can be utilized separately or combined in a manner similar to that illustrated in FIG. 3. In the distribution depicted on the left side of dashed line 18, fibers 19 can be uniformly arranged within coating layer 12. Alternatively, or additionally, the distribution of fibers 19 on the right side of dashed line 18 includes a decreasing concentration of fibers 19 in the radially outwardly oriented direction. This results of these distributions are the same as discussed above with regard to FIG. 2.

The embodiment of metallic fillers as fibers 19 has the advantage that, depending on the length of fibers 19, the heat produced respectively in an interior of coating layer 12 can be quickly dissipated without interruption through elastic matrix material 16. Additionally, fibers 19 can provide a higher stiffness of coating layer 12.

In the embodiment according to FIG. 3, a metal layer 21 can be provided at a surface 20 of coating layer 12, such that a very smooth surface of the roller is achieved. The metal layer can have a thickness of, e.g., approximately 10 $\mu$m. In this manner, due to this minimal thickness, the elasticity of the roller coating may be maintained.

A portion of fibers 19, which is indicated with reference numeral 19', can extend up to surface 20 of coating layer 12 and, thus, can be in contact with metal layer 21. In this manner, an especially safe connection of metal layer 21 with coating layer 12 can be produced.

In a similar way, the embodiments of FIGS. 1, 2, and 4 can also be provided with a metal layer 21.

In the embodiment depicted in FIG. 4, fiber layers 22 can be embedded in elastic matrix material 16 of coating layer 12 and may extend essentially concentrically to roller core 10. Fiber layers 22 can result, e.g., when coating layer 12 is produced by winding fiber rovings 4, e.g., in a manner illustrated in FIG. 6.

FIG. 5 cross-sectionally illustrates a plurality of fibers 1 which are formed as either metallic fibers or fibers coated with a metal. Fibers 1 can be combined in a comb-shaped or rake-shaped collecting unit 3 into single-layer fiber bundles, i.e., fiber rovings 4.

A respective fiber roving 4 can be separated from a neighboring roving 4 by a tooth 6 of collecting unit 3. In this manner, a uniform distribution of fibers 1 within a roving band 7 formed by fiber rovings 4 may be ensured.

While in FIG. 5, rovings 4 are represented in an idealized way as a single layer, in practice, roving 4 can include a plurality of fiber layers of which each individual fiber has a diameter of, e.g., approximately 8 to 12 $\mu$m, and roving 4 can have a thickness of, e.g., approximately 0.1 to 0.3 mm. It is important that the width of roving 4, relative to the thickness, is substantially greater so that it has substantially a single-layer construction.

FIG. 6 illustrates an exemplary embodiment depicting the guiding and combining of fibers 1, as well as additional fibers 2. In particular, fibers 1 and additional fibers 2 can be guided across collecting unit 3 and combined into roving band 7. Thereafter, roving band 7 can be guided through a coating device 8, which is provided when fibers 1 and 2 do not include metal, but are only fiber bases to be coated with metal. For example, fibers 1 and 2 can include, e.g., carbon, glass, aramide, or other suitable materials. In coating device 8, individual rovings 4 are coated with liquid metal 9 so that rovings 4 are completely enveloped within metal. In a similar manner, roving band 7 can be subsequently pulled through a matrix bath (not shown) so that the metal-coated fibers can be finally completely embedded in the matrix material.

Roving band 7, which is coated and completely embedded in matrix material can be subsequently wound onto roller core 10 with butt joints so that, after one winding process over an entire length of roller core 10, roller core 10 is completely coated with a roving layer. This winding process can be performed multiple times until a coating layer 12 with a thickness of, e.g., approximately 3 to 20 mm is produced.

Subsequently, coating layer 12 can be ground for producing a smooth surface, or, as indicated in FIG. 3, can be provided with a metal coating 21.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS 1 fibers
2 fibers
3 collecting unit
4 fiber roving
6 tooth
7 roving band
8 coating device
9 metal bath
10 roller core
12 coating layer
13 metal foam
14 pores
15 elastic matrix material
16 elastic matrix material
17 metallic fillers
18 dashed line
19, 19' fibers
20 surface
21 metal layer
22 fiber layers

What is claimed is:

1. An elastic roller comprising:
a hard roller core;
an elastic coating layer at an outer side of said hard roller core;
said elastic coating layer comprising an elastic matrix material and fillers imbedded in said matrix material, wherein a thermal conductivity of said fillers is considerably higher than a thermal conductivity of said matrix material; and
at least a portion of said fillers comprising metallic fillers arranged to improve thermal conductivity of said elastic coating layer such that heat is dissipated toward the hard roller core and dissipated axially by the hard roller core, wherein the elastic coating layer has a smooth surface structured and arranged for smoothing paper webs;
wherein said elastic roller is formed with a length within a range of 3 to 12 m and a diameter within a range of 450 to 1500 mm and is structured to withstand compressive forces of up to 130 N/mm$^2$.

2. The elastic roller in accordance with claim 1, wherein said hard roller core comprises metal, and wherein said metallic fillers comprise metal fibers.

3. The elastic roller in accordance with claim 1, wherein at least a portion of said metallic fillers comprises a metal foam.

4. The elastic roller in accordance with claim 3, wherein said metal foam is one of impregnated and filled with said elastic matrix material.

5. The elastic roller in accordance with claim 3, wherein said metal foam comprises pores which are at least partially filled with said elastic matrix material.

6. The elastic roller in accordance with claim 1, wherein at least a portion of said metallic fillers comprises a metal powder.

7. The elastic roller in accordance with claim 6, wherein said metal powder comprises one of nickel powder and chains of nickel powder.

8. The elastic roller in accordance with claim 6, wherein said metal powder comprises small particles having particle sizes of between approximately 5 to 50 $\mu$m.

9. The elastic roller in accordance with claim 8, wherein said particle sizes are between approximately 10 to 20 $\mu$m.

10. The elastic roller in accordance with claim 1, wherein at least a portion of said metallic fillers comprises one of metal fibers, metal rovings, metal-coated fibers, and metal-coated rovings.

11. The elastic roller in accordance with claim 10, wherein the at least a portion of said metallic fillers comprises one of metal-coated fibers and metal-coated rovings.

12. The elastic roller in accordance with claim 11, wherein fibers of said one of said metal-coated fibers and said metal-coated rovings comprise at least one of carbon and glass.

13. The elastic roller in accordance with claim 10, wherein at least a portion of said fibers is aligned in the axial direction.

14. The elastic roller in accordance with claim 13, wherein said at least a portion of said fibers comprises a predominant portion of said fibers.

15. The elastic roller in accordance with claim 10, wherein at least a portion of said fibers is aligned in the radial direction.

16. The elastic roller in accordance with claim 15, wherein said at least a portion of said fibers comprises a predominant portion of said fibers.

17. The elastic roller in accordance with claim 10, wherein at least a portion of said fibers is aligned in statistical distribution.

18. The elastic roller in accordance with claim 17, wherein said at least a portion of said fibers comprises a predominant portion of said fibers.

19. The elastic roller in accordance with claim 10, wherein said fibers are arranged in one of a fiber layer and radially sequentially arranged fiber layers.

20. The elastic roller in accordance with claim 1, wherein at least a portion of said metallic fillers are elastically formed.

21. The elastic roller in accordance with claim 1, said elastic layer further comprising additional fillers arranged in said elastic matrix material.

22. The elastic roller in accordance with claim 21, wherein said additional fillers comprise fibers including at least one of carbon and glass fibers.

23. The elastic roller in accordance with claim 21, wherein said additional fillers comprise at least one of quartz and PTFE.

24. The elastic roller in accordance with claim 1, wherein said metallic fillers are arranged to extend up to a radially outer surface of said elastic matrix material.

25. The elastic roller in accordance with claim 24, wherein said metallic fillers are arranged to penetrate said radially outer surface.

26. The elastic roller in accordance with claim 1, wherein a radially outer surface of said elastic matrix material is coated with metal.

27. The elastic roller in accordance with claim 1, wherein a portion of said metallic fillers are arranged to extend radially inwardly up to a surface of said hard roller core.

28. The elastic roller in accordance with claim 1, wherein a thermal expansion coefficient of said metallic fillers is smaller than a thermal expansion coefficient of said matrix material.

29. The elastic roller in accordance with claim 28, wherein said thermal expansion coefficient of said metallic fillers is substantially the same as a thermal expansion coefficient of said hard roller core.

30. The elastic roller in accordance with claim 1, wherein said coating layer comprises a functional layer arranged in a radially outwardly region and a connecting layer arranged in a radially inwardly region,
wherein said connecting layer is adapted to connect said functional layer to said hard roller core, and
wherein said metallic fillers are arranged at least in said functional layer.

31. The elastic roller in accordance with claim 1, wherein said matrix material comprises a plastic material.

32. The elastic roller in accordance with claim 31, wherein said plastic material comprises one of a thermosetting resin and a thermoplastic material.

33. The elastic roller in accordance with claim 1, wherein said matrix material comprises a resin-hardener combination.

34. The elastic roller in accordance with claim 1, wherein a concentration of said metallic fillers is substantially uniformly distributed within said elastic matrix material.

35. The elastic roller in accordance with claim 34, wherein said metallic fillers comprise metal powder.

36. The elastic roller in accordance with claim 34, wherein said metallic fillers comprise at least one of metal fibers and metal coated fibers.

37. The elastic roller in accordance with claim 1, wherein a concentration of said metallic fillers increases in a radially inwardly direction toward said hard roller core.

38. The elastic roller in accordance with claim 37, wherein said metallic fillers comprise metal powder.

39. The elastic roller in accordance with claim 37, wherein said metallic fillers comprise at least one of metal fibers and metal coated fibers.

* * * * *